March 29, 1938.  C. J. CRETORS  2,112,358
CORN POPPING MACHINE
Filed July 19, 1937  2 Sheets-Sheet 1

Inventor:
Charles J. Cretors,
By: Arthur W. Nelson
Attorney.

March 29, 1938. C. J. CRETORS 2,112,358
CORN POPPING MACHINE
Filed July 19, 1937 2 Sheets-Sheet 2
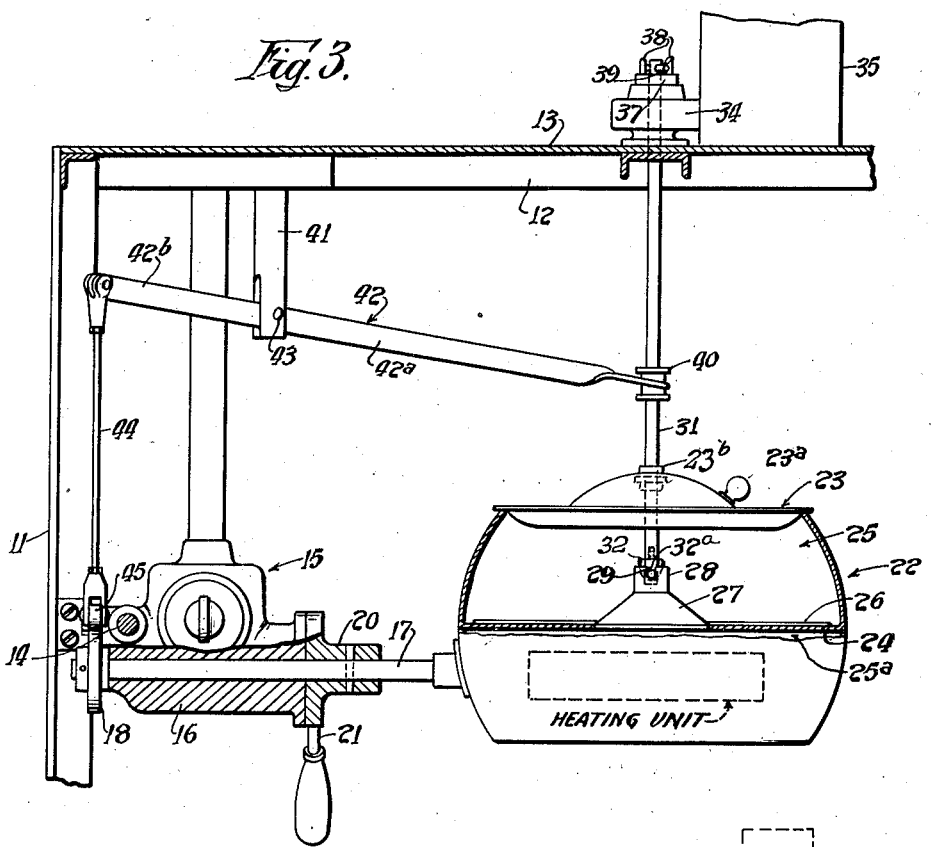
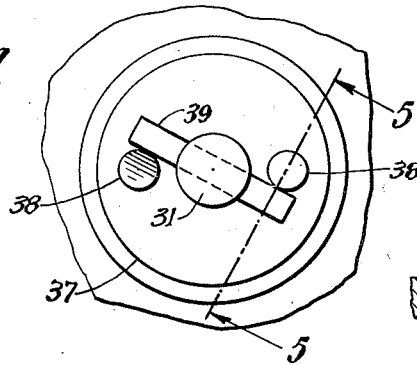
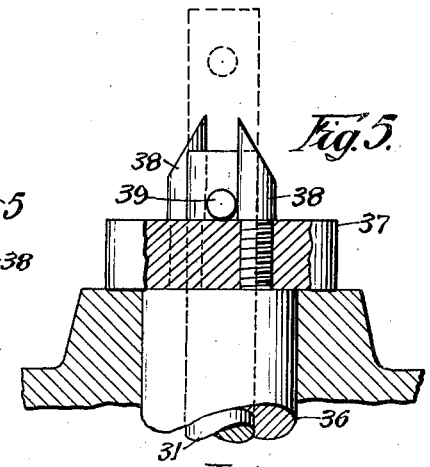
Inventor:
Charles J. Cretors,
By: Arthur W. Nelson
Attorney.

Patented Mar. 29, 1938

2,112,358

UNITED STATES PATENT OFFICE 2,112,358

CORN POPPING MACHINE

Charles J. Cretors, Chicago, Ill.

Application July 19, 1937, Serial No. 154,387

8 Claims. (Cl. 53—4)

This invention relates to improvements in corn popping machines and it consists of the matters hereinafter described and more particularly pointed out in the appended claims. The invention is more particularly concerned with popping machines of the kind that include a popping bowl which is movable from a popping position to an emptying position and with which a cover and an agitator are associated.

One of the objects of the invention is to provide a popping machine of the kind above mentioned wherein the act of moving the popping bowl into its emptying position removes the cover and disconnects the agitator from its driving means.

Another object of the invention is to provide a machine of this kind which, though simple in construction, is efficient in operation.

The above mentioned objects of the invention, as well as others, together with the several advantages thereof will more fully appear as I proceed with my specification.

In the drawings:

Fig. 3 is a vertical sectional view through a part of the machine illustrated in Fig. 1, with a portion of the popping bowl broken away, the plane of the section being indicated by the line 3—3 of Fig. 1.

Fig. 4 is a plan view on an enlarged scale of a simple clutch mechanism embodied in the machine and which will be more fully described later.

Fig. 5 is a vertical sectional view through the clutch shown in Fig. 4 as taken on the line 5—5 thereof.

Figure 1:
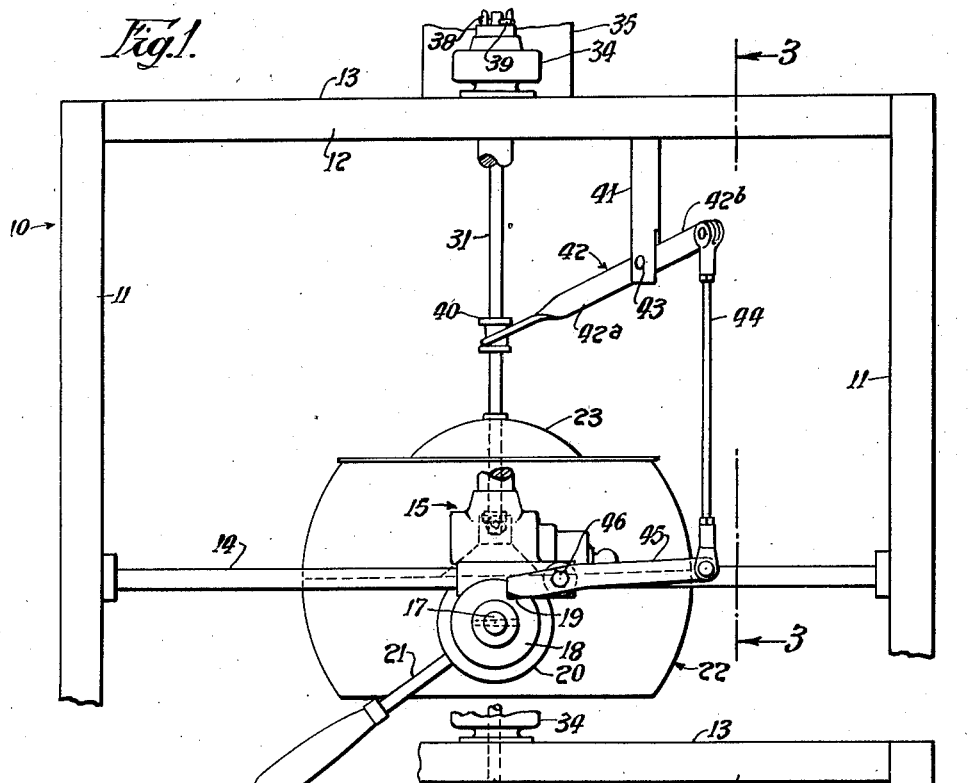
Fig. 1 is a view in side elevation of a portion of a corn popping machine, with which the invention is more particularly concerned, the popping bowl being shown in its popping position.

Referring now in detail to that embodiment of the invention illustrated in the accompanying drawings: 10 indicates as a whole a portion of the framework of a corn popping machine and which includes pairs of upright corner posts 11—11 and top connecting member 12, the latter member supporting a top plate 13. A horizontal bar 14 connects a pair of the upright corner members of the frame together. A bracket casting 15 is secured at about the middle of the bar 14. Said bracket is formed to provide a relatively long bearing 16 for a horizontal rock shaft 17 that extends in a plane at a right angle to the bar 14. A cam disk 18 is secured to the outer end of the shaft up against the outer end of the bearing 16 and in which disk is a cam recess 19. A collar 20 is fixed to the shaft up against the inner end of said bearing and said collar carries a lever 21 as best appears in Figs. 1 and 2. It is apparent that when the lever 21 is swung in one direction or the other, the shaft 17 is rocked in its long bearing 16.

A popping bowl 22 is fixed to the inner end of the shaft. This bowl, when in corn popping position, has its open top disposed in a horizontal plane and a cover or lid 23 closes said top during corn popping operations. Said lid has a knob 23ª. The bowl has a horizontal partition 24 that divides the same into an upper popping chamber 25 and a lower heating chamber 25ª, which contains a suitable means shown diagrammatically in Fig. 3 to supply the heat necessary for popping the corn placed in the compartment 25. Preferably the heating means in the chamber 25ª is an electrical heating unit. An agitator 26 is provided in the chamber 25 and engages on the partition 24. This agitator includes a central core-like hub 27 arranged axially of the bowl. The top end of the hub is formed with a recessed extension 28 in which is located a pair of oppositely disposed upwardly opening notches 29.

As a means for driving the agitator, an upright shaft 31 is provided at its bottom end with a nut 32 carrying a cross pin 32ª to engage in the notches 29 in the hub extension 28 to detachably connect the shaft to the agitator. This shaft extends axially through a sleeve 23ᵇ carried by the cover 23 whereby the cover may have a sliding movement on the shaft 31. The top end of said shaft extends up through a gear reduction set 34 operatively connected to and driven by a motor 35 that is supported upon the top plate 13 of the machine frame. The gear reduction set includes an upright, tubular drive shaft 36 (see Fig. 5) through which the shaft 31 has sliding bearing.

At the top end of the driven shaft 36 is a head 37 having a pair of upright pins 38 secured therein, which are spaced a greater distance apart than the diameter of the shaft 31. The top ends of said pins are beveled off in opposite directions at rather steep angles as appears in Fig. 5. The top end of the shaft 31 carries a cross pin 39 which normally engages on the top of the head, the pin being of such a length as to engage opposite sides of the pins 38. It is apparent that when the shaft 31 is in this position and when the tubular shaft 36 of the gear reduction set is being driven from the motor 35, the pins 38 engage the cross pin 39 to drive the shaft 31. When the shaft 31 is elevated to a position wherein its cross pin 39 is disposed above the pins 38, the driving connection between the shafts 36 and 31 is broken.

An annularly grooved collar 40 is secured to the shaft 31 a suitable distance above the cover 23 and collar 33, before mentioned. As will hereinafter appear, said collar 40 forms a part of the means whereby the shaft 31 is elevated axially to disconnect it from both the agitator and the gear reduction set 34.

A post 41 depends from the top plate 13 and a lever 42 is pivoted at 43 in the bifurcated bottom end of the post. The load arm 42a of said lever is formed at its ends for operative engagement with the collar 40. The power arm 42b of said lever has the top end of a link or connecting rod 44 pivotally connected thereto. The bottom end of said link is pivotally connected to the long arm of a lever 45 arranged in the plane of the cam disk 18 on the shaft 17. The lever 45 is pivoted as at 46 to the bracket 15 before mentioned and its short arm is adapted to ride on the edge of the cam disk 18 and to normally engage in the recess 19 in said disk.

Assume that a suitable quantity of corn has been placed in the chamber 25 of the popping bowl which stands with its open top in a horizontal plane. Also assume that the cover 23 is in a position closing the said chamber and that the shaft 31 is operatively connected to both the agitator 26 and the gear reduction set 34. At this time the short arm of the lever 45 is engaged in the recess 19 of the cam disk 18. With the motor 35 energized and with the heating element in the bowl chamber 25a in its "on" position, the corn soon starts popping, being agitated during this operation. Should it be desired to inspect the condition of the popping corn at any time, the knob 23a is grasped and the cover slid upwardly on the rod. When the knob is released, the cover drops back in place upon the bowl to close the popping chamber thereof. The cover is made of a relatively light gauge metal. Thus as the corn is being popped in the chamber 25 and increases in bulk, it lifts the cover upwardly on the shaft to permit the popped corn to spill over the top edge of the hopper into the popper case.

Figure 2:
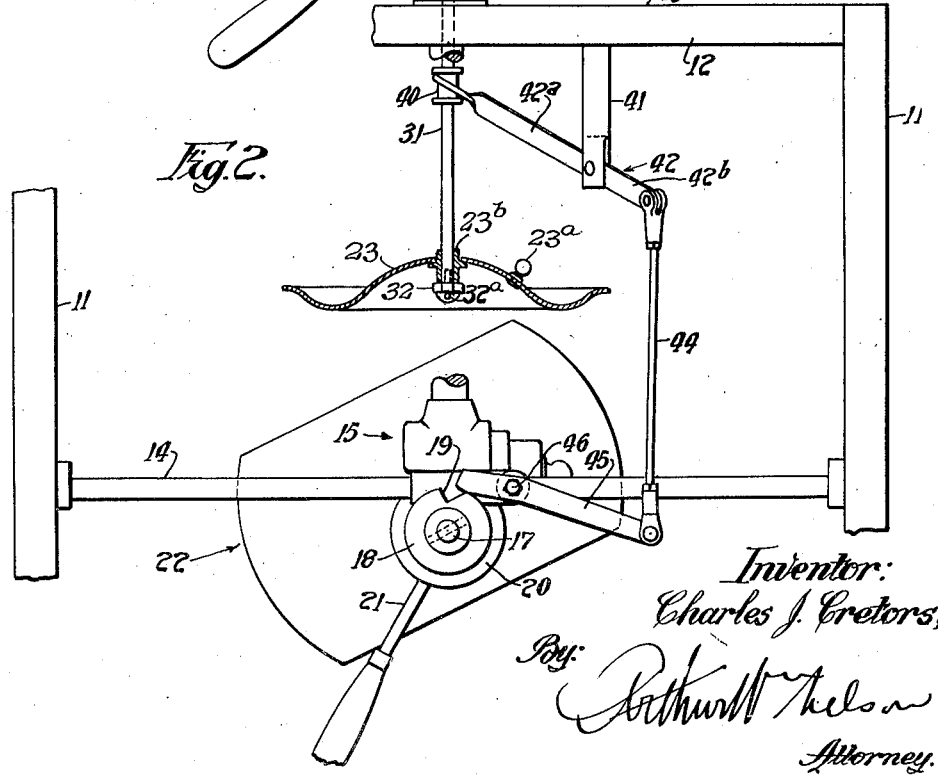
Fig. 2 is a view similar to Fig. 1 with the parts in a changed position and wherein the cover has been removed from the bowl which is now rocking toward its emptying position.

When the corn has been popped, the operator moves the lever 21 downwardly to swing it in a counter clockwise direction as appears in Figs. 1 and 2. The short arm of the lever 45 rides out of the notch 19 and swings said lever clockwise, exerting a downward pull on the link 44 to swing the lever 42 clockwise as appears in Figs. 1 and 2. By reason of the engagement of said lever 42 with the collar 40 on the shaft 31, said shaft is elevated axially. This withdraws the pins 32 and 39 from engagement with the agitator and the gear reduction set 34 respectively. In this elevation or upward movement of the shaft, the nut 32 thereon picks up the cover 23 to lift it upwardly from the popping bowl. Of course in this rocking movement of the shaft 17, the popping bowl being fixed to said shaft will turn toward its emptying position, as shown in Fig. 2. Further rocking movement of the shaft 17 through actuation of the lever 21 swings the bowl into its emptying position, at which time the popped corn is discharged from the bowl and the bowl then recharged for further operation. It is pointed out that during this further movement of the bowl into emptying positiion, it swings past the bottom end of the shaft 31 and as the lever arm 45 is at this time riding the edge of the cam disk 18, there is not further movement of shaft 31 and connecting parts.

When the lever 21 is swung clockwise, when viewed in Fig. 2, the bowl returns to its popping position, the shaft 31 enters the bowl to engage with the agitator and the cover slides into closing position on the bowl. In this downward movement of the shaft 31, the cross pin 39 engages on the bevelled end surfaces of the pins 38 to find its position between said pins to connect the shaft 31 to the gear reduction set to be driven thereby. In this respect it is pointed out that the pins 38 have a length greater than the depth of the notches 29 in the agitator hub extension 28 so that the pin 32 rides the top of the extension to find its own engagement in the notches therein. At this time the short arm of the lever 45 is engaged in its recess 19 in the cam disk 18 so that all parts are now in position for further popping operation.

The construction described is simple in construction, and is easy to operate with one hand, leaving the other one free for other duties to be performed at this time.

While in describing the invention, I have referred in detail to the form, arrangement and construction of the parts involved, the same is to be considered only in the illustrative sense so that I do not wish to be limited thereto except as may be specifically set forth in the appended claims.

I claim as my invention:

1. In a corn popping machine, means providing a popping bowl, means for mounting the bowl for movement from a popping position to an emptying position, a cover for said bowl, agitator means in said bowl, means for driving said agitator means, means for moving said bowl from its popping position to its emptying position, and means operating in timed relation with respect to said last mentioned means for removing the cover from the bowl and for disconnecting said agitator means from said driving means.

2. In a corn popping machine, means providing a popping bowl, means for mounting the bowl for movement from a popping position to an emptying position, agitator means in said bowl, driving means, means for transmitting power from said driving means to said agitator means for actuating the same, a cover for said bowl mounted on said power transmitting means, means for moving the bowl from its popping position to its emptying position, and means operating in timed relation to said last mentioned means for moving said cover with respect to said transmitting means and away from the bowl to uncover the same and to disconnect said power transmitting means from said driving means.

3. In a corn popping machine, means providing a popping bowl, means for mounting the bowl for movement from its popping position to its emptying position, agitator means in said bowl, driving means, means including a shaft for operatively connecting said agitator means and said driving means, a cover for said bowl, means for moving said bowl from its popping position to its emptying position, and means operating in timed relation with respect to said last mentioned means for removing the cover from the bowl and for disconnecting said shaft from said driving means.

4. In a corn popping machine, means providing a popping bowl, means for mounting the bowl for movement from its popping position to its emptying position, agitator means in said bowl, driving means, means including a shaft for operatively connecting said agitator means and said driving means, a cover for said bowl movable longitudinally on said shaft, means for moving said bowl from its popping position to its emptying position, and means operating in timed relation with said last mentioned means for moving the shaft and the cover thereon away from said bowl and for disconnecting said shaft from the driving means.

5. In a corn popping machine, means providing a popping bowl, a shaft to which the bowl is secured, said shaft being mounted for a rocking movement from the popping position of the bowl to the emptying position therefor, agitator means in said bowl, driving means, means including a second shaft for operatively connecting said agitator means and said driving means, a cover for said bowl mounted on said second shaft for movement toward and away from the bowl, means for rocking the first mentioned shaft from the popping position of said bowl to the emptying position of said bowl, and means actuated from said first mentioned shaft, when being moved toward the emptying position for said bowl, to move said second shaft and the cover thereon away from the bowl and for disconnecting said second shaft from the driving means.

6. In a corn popping machine, a rockshaft, means providing a popping bowl carried by said shaft, means for rocking said shaft to move said bowl from its popping position to its emptying position, agitator means in said bowl, driving means, means including a second shaft for operatively connecting said agitator means and said driving means together, a cover for said bowl mounted on said second shaft, and linkage and lever means arranged between said second shaft and said rockshaft and operative as the rockshaft is rocked toward the emptying position of said bowl for disconnecting said second shaft from said driving means and for moving said second shaft and the cover thereon away from said bowl.

7. In a corn popping machine, a rockshaft, means providing a popping bowl carried by said shaft, means for rocking said shaft to move said bowl from its popping position to its emptying position, agitator means in said bowl, driving means, means including a second shaft for operatively connecting said agitator means and said driving means together, a cover for said bowl mounted on said second shaft, a cam on said rockshaft, a pivoted lever operatively engaged with said cam, a second pivoted lever operatively engaged with said second shaft, means connecting said levers, said levers and said last mentioned means operating through the cam when the rockshaft is rocked from the popping to the emptying position for the bowl to disconnect said second shaft from the driving means and to move said second shaft and the cover thereon away from said bowl.

8. In a corn popping machine, means providing a popping bowl, means for mounting the bowl for movement from a popping position to an emptying position, an agitator in said bowl, a shaft, a driving means, means providing a clutch connection between the ends of said shaft and said agitator and said driving means respectively, a cover for said bowl, and mounted on said shaft, means for moving the bowl from its popping position to its emptying position, and means operating in the movement of the bowl toward its emptying position for moving the shaft to unclutch said clutch connections between the shaft and its driving means and between said shaft and agitator and for moving said shaft and the cover thereon away from said bowl.

CHARLES J. CRETORS.